United States Patent [19]
Zhong et al.

[11] Patent Number: 5,700,597
[45] Date of Patent: Dec. 23, 1997

[54] METHOD FOR PREPARING $LI_{1+x}MN_{2-x-y}M_yO_4$ FOR USE IN LITHIUM BATTERIES

[75] Inventors: Qiming Zhong; Ulrich Von Sacken, both of Coquitlam; Yuan Gao, Delta; Jeffery Raymond Dahn, Surrey, all of Canada

[73] Assignee: Moli Energy (1990) Limited, Canada

[21] Appl. No.: 568,244

[22] Filed: Dec. 6, 1995

[30] Foreign Application Priority Data

Nov. 24, 1995 [CA] Canada .................................... 2163695

[51] Int. Cl.$^6$ ..................................................... H01M 4/50
[52] U.S. Cl. ............................................. 429/218; 429/224
[58] Field of Search ...................................... 429/224, 218

[56] References Cited

U.S. PATENT DOCUMENTS

| | | | |
|---|---|---|---|
| 5,196,279 | 3/1993 | Tarascon | 429/218 |
| 5,264,201 | 11/1993 | Dahn et al. | |
| 5,316,877 | 5/1994 | Thackeray et al. | 429/218 |
| 5,370,710 | 12/1994 | Nagura et al. | 29/623.1 |
| 5,418,090 | 5/1995 | Koksbang et al. | 429/224 |

OTHER PUBLICATIONS

Feng et al., "Li Extraction/Insertion withSpinel-Tpe Lithium Manganese Oxides, Charactrization of Redox-Type and Ion-Exchange Type Sites", Langmuir, pp. 1861–1867, Aug. 1992.

Russouw et al., "Structural Aspects of Lithium–Manganese Oxide Electrodes For Rechargeable Lithium Batteries", Mat. Res. Bull., vol. 25, pp. 173–182 (no month). 1990.

Massarotti, et al., "Structural and Defect Study on LiMn204 Formation", Z. Naturforsch., 51a, pp. 267–276, Apr. 1996.

Tarascan, et al., "The Spinel Phase of $LiMn_2O_4$ as a Cathode in Secondary Lithium Cells", J. Electrochem. Soc., vol. 138, No. 10, Oct. 1991, p. 2859.

Thackeray, et al., "Spinel Electrodes from the Li–Mn–O System for Rechargeable Lithium Battery Applications", J. Electrochem. Soc., vol. 139, No. 2, Feb. 1992, p. 363.

Yamada, et al., "Synthesis and Structural Aspects of $LiMn_2O_4±δ$ as a Cathode for Rechargeable Lithium Batteries", J. Electrochem. Soc., vol. 142, No. 7, Jul. 1995, p. 2149.

Baochen, et al., "Studies of spinel $LiCr_xMn_{2-x}O_4$ for secondary lithium battery", Journal of Power Sources, 43–44, (1993), p. 539–546 no month available.

Tarascon, et al., "The $Li_{1+x}Mn_2O_4$/C system Materials and electrochemical aspects", Journal of Power Sources, 54, (1995), p. 103–108 no month available.

Manev, et al., "Rechargeable lithium battery with spinel-related λ-$MnO_2$ III. Scaling-up problems associated with $LiMn_2O_4$ synthesis", Journal of Power Sources, 54, (1995), p. 323–328 no month available.

Yazami, et al., "High performance $LiCoO_2$ positive electrode material", Journal of Power Sources, 54, (1995), p. 389–392 no month available.

Richard, et al., "The effect of ammonia reduction on the spinel electrode materials, $LiMn_2O_4$ and $Li(Li_{1/3}Mn_{5/3}O_4)$", Solid State Ionics, 73 (1994), p. 81–91 no month available.

Gao and Dahn, "Thermogravimetric analysis to determine the lithium to manganese atomic ratio in $Li_{1+x}Mn_{2-x}O_4$", Appl. Phys. Lett., 66 (19), 8 May 1995, p. 2487.

*Primary Examiner*—Stephen Kalafut
*Assistant Examiner*—Carol Chaney
*Attorney, Agent, or Firm*—Lerner, David, Littenberg, Krumholz & Mentlik

[57] ABSTRACT

Spinel insertion compounds $Li_{1+x}Mn_{2-x-y}M_yO_4$ wherein M is a transition metal, $0<x<$ about 0.33, $0≤y<$about 1, can have relatively low surface area at relatively large values of x when prepared with a novel two step heating method. $Li_1Mn_{2-y}M_yO_4$ is first prepared between a critical temperature, $T_c$, and about 900° C. Then, a lithium salt is mixed therewith and reacted at a temperature between about 400° C. and $T_c$. These compounds are suitable for use as a cathode in a lithium battery. The use of LiCl as the lithium salt can provide improved cycle life results in such a battery.

26 Claims, 6 Drawing Sheets

METHOD FOR PREPARING $Li_{1+x}Mn_{2-x-y}M_yO_4$ FOR USE IN LITHIUM BATTERIES

FIELD OF THE INVENTION

This invention pertains to methods for the preparation of lithium manganese oxide insertion compounds, denoted $Li_{1+x}Mn_{2-x-y}M_yO_4$, and the use thereof as an electrode material in lithium batteries.

BACKGROUND OF THE INVENTION

Insertion compounds are defined as solids that act as a host for the reversible insertion of guest atoms. Such compounds, particularly lithium insertion compounds, have been extensively studied in recent years for purposes that include use as electrode materials in lithium ion batteries. Lithium ion batteries are the state-of-the-art power sources for consumer electronics. They are used in such devices as lap-top computers, cellular phones, and camcorders. They have excellent cycle life, high volumetric energy density (Wh/L), and high gravimetric energy density (Wh/kg). As a result, lithium ion battery technology is being developed for electric vehicle applications as well.

Lithium ion batteries use two different insertion compounds for the active cathode and anode materials. Upon discharge of the battery, lithium is extracted from the anode while lithium is concurrently inserted into the cathode. The reverse processes occur on recharge of the battery. The excellent reversibility of lithium insertion makes such compounds function extremely well in rechargeable battery applications wherein thousands of battery cycles can be obtained.

The commercial lithium ion battery products being marketed today use $LiCoO_2$ as the cathode material and a carbon or graphite as the anode material. Non-aqueous electrolytes are employed comprising $LiBF_4$ or $LiPF_6$ salts and solvent mixtures of ethylene carbonate, propylene carbonate, diethyl carbonate, and the like.

$LiCoO_2$ however is expensive since its price is ultimately tied to that of cobalt, a relatively rare transition metal. Partly for this reason, lithium ion batteries are quite expensive to produce and manufacturers are searching for inexpensive replacements for $LiCoO_2$. $LiMn_2O_4$ is a particularly attractive cathode material candidate because manganese is significantly cheaper than cobalt. $LiMn_2O_4$ refers to a stoichiometric lithium manganese oxide with a spinel crystal structure. This stoichiometric compound however has been found to exhibit undesirably poor cycle life when used as the cathode in lithium ion batteries of conventional construction. These cycle life problems have been overcome by varying the stoichiometry and methods of synthesis to some extent. Other disadvantages of $LiMn_2O_4$ include a somewhat lower capacity and a somewhat higher operating voltage than $LiCoO_2$ (the latter placing greater demands on electrolyte stability).

In U.S. Pat. No. 5,316,877, M. M. Thackeray et al. show how to achieve a significant capacity versus cycle life improvement by incorporating additional lithium into the conventional stoichiometric spinel $LiMn_2O_4$. Therein, the compound was denoted as $Li_1D_{\sigma/b}M_{2-x}O_{4+\sigma}$. When D is Li, $\sigma$ is 0 and the improved compound can be denoted $Li_{1+x}Mn_{2-x}O_4$ wherein $0 \leq x < 0.33$. x represents the amount of excess lithium which is believed to occupy the 16d manganese sites in the spinel structure.

A typical synthesis for $Li_{1+x}Mn_{2-x}O_4$ involves the solid state reaction of a manganese oxide and the appropriate amount of lithium salt at elevated temperature. Besides the methods in the preceding reference, various other synthesis methods have been proposed. For instance, in the Journal of Power Sources, 54, 103 (1995), Tarascon et al. do the following: electrolytic manganese dioxide (EMD) and $Li_2CO_3$ are well mixed, heated to 800° C. in air for 48 hours, cooled and ground in a ball mill, reheated to 800° C. in air for 24 hours, and finally slow cooled to room temperature. The heating temperature is presumably chosen to get reasonable reaction rates and to stay below the multiphase region which is reported therein as being above 880° C.

An alternate means of preparing $Li_{1+x}Mn_{2-x}O_4$ was shown in J. Power Sources, 54, 323 (1994) by Manev et al. Therein, chemical manganese dioxide (CMD) and either $LiNO_3$ or $Li_2CO_3$ were used as reactants. A single heat treatment at temperatures between 450° C. and 850° C. was used with the optimum synthesis temperature being between 700° C. and 800° C. The optimum synthesis temperature is independent of x according to these workers. Better cycling performance is noticed for materials made with larger x.

In Solid State Ionics, 73, 81 (1994), M. N. Richard et al. prepared $Li_{1+x}Mn_{2-x}O_4$ with very large amounts of excess lithium (x=0.33) via two different routes using mixtures of various reactants at temperatures near 400° C. In the first, CMD and $Li_2CO_3$ were mixed and then reacted at 400° C. in air. In the second, $\gamma$-MnOOH and LiOH were mixed and reacted at 450° C. Each of these synthesis methods results in low capacity materials with large surface areas. The use of reactants like EMD lead to low surface area products but attempts at synthesis using EMD fail at these low temperatures. According to M. M. Thackeray et al., J. Electrochem. Soc., 139, 363 (1992), low temperatures must be used for such preparation. This conclusion was based on empirical evidence. No theoretical reasons were given for this conclusion.

In the aforementioned article by Tarascon et al., thermal gravimetric analyses were performed on $Li_{1+x}Mn_{2-x}O_4$ samples. A transition occurs to a tetragonal, oxygen deficient phase beginning near 870° C. Yamada et al. call this oxygen deficient phase $LiMn_2O_{3.86}$ in J. Electrochem. Soc., 142, 2149 (1995)).

In a related paper by the instant inventors, Y. Gao et al., Applied Physics Letters 66, 2487 (1995), thermal gravimetric analysis measurements were performed on two series (A and B) of $Li_{1+x}Mn_{2-x}O_4$ samples. The two series were prepared using two heating steps at different temperatures to illustrate the independence of the results from the method of preparation. The method of preparation for series B was described erroneously in that the total final amount of lithium was actually incorporated in the first of the heating steps. The thermal gravimetric analysis showed two weight-loss kinks in the $Li_{1+x}Mn_{2-x}O_4$ data curves. The temperature of the first weight-loss kink, called $T_{c1}$, depends on x. On the other hand, the temperature of the second, $T_{c2}$, does not depend on x. It was shown that the value of x could be derived from $T_{c1}$ temperature data. On close examination, the two weight-loss kinks are also evident in the data in aforementioned article by Tarascon et al. The reason for the weight loss event that occurs at $T_{c1}$ however does not appear to have been reported on in the literature.

In general, it is known in the art that lower temperature syntheses of typical cathode lithium insertion compounds result in products with higher surface areas. For instance, in the Journal of Power Sources (1995) 54(2) 389–392, R. Yazami et al. compare the properties of $LiMO_2$ (M=Co, Ni) and $LiMn_2O_4$ compounds synthesized at low and high temperatures. Along with other differences, the low temperature prepared compounds were generally characterized by higher surface area.

It can be advantageous to use cathode materials with low surface area in battery applications. Although the battery rate capability may be enhanced somewhat, the rate of electrolyte decomposition increases with cathode surface area thereby affecting battery longevity. Additionally, larger surface areas can increase the likelihood and severity of fire or explosion during certain types of battery abuse (such as illustrated in U.S. Pat. No. 5,264,201 for batteries comprising $LiNiO_2$ cathodes).

Along with lithium, other elements including transition metals can be substituted for manganese in $LiMn_2O_4$. These compounds can be generally denoted $Li_{1+x}Mn_{2-x-y}M_yO_4$ wherein M is a transition metal such as nickel (as discussed in J. M. Tarascon et al., J. Electrochem. Soc. Vol. 138, No. 10, 1991) or chromium (as discussed in W. Baochen et al., J. Power Sources, 43–44, (1993) 539–546). The amount of substituted transition metal, y, can be as large as 1 (such is the case for chromium in the preceding Boachen article). Such transition metal substitution appears to offer certain advantages in battery applications.

SUMMARY OF THE INVENTION

This invention is directed to obtaining $Li_{1+x}Mn_{2-x-y}M_yO_4$ cathode material having both substantial excess lithium, x, and also low surface area in combination. The combination is desirable because the former provides for good cycling performance while the latter can provide somewhat improved cycle life/storage performance and safety behaviour. It is believed that relatively low temperature synthesis is required to achieve product comprising substantial levels of excess lithium. On the other hand, it is believed that relatively high temperature synthesis is required to achieve product having low surface area. We have discovered that a two step heating method can provide a product having both characteristics.

In the $Li_{1+x}Mn_{2-x-y}M_yO_4$ insertion compound, M is a transition metal, x is a number greater than zero and less than 0.33, and y is a number greater than or equal to zero and less than about 1. The insertion compound has a spinel-like (also described herein as spinel-phase) crystal structure and a maximum critical temperature for phase stability $T_c$. The method of the invention comprises: obtaining an insertion compound intermediate having the approximate formula $Li_1Mn_{2-y}M_yO_4$ and a spinel-phase crystal structure wherein the insertion compound intermediate is prepared by heating an intermediate stoichiometric mixture of an intermediate reactant lithium salt and an intermediate reactant manganese compound at an intermediate reaction temperature in the range from greater than $T_c$ but less than about 900° C.; making a final stoichiometric mixture of the insertion compound intermediate and a final reactant lithium salt at a mixing temperature less than $T_c$; and heating the final stoichiometric mixture at a final reaction temperature in the range from greater than about 400° C. to less than about $T_c$.

We have additionally discovered that the maximum critical temperature for phase stability $T_c$ is equivalent to the temperature $T_{c1}$ as defined in the aforementioned article by Gao et al., Applied Physics Letters, 66, 2487 (1985). However, this temperature is a function of x. The final reaction temperature therefore must be lower for greater values of x in order to synthesize high quality, single phase $Li_{1+x}Mn_{2-x-y}M_yO_4$. The preceding applies both to insertion compounds wherein lithium and other transition metals have been substituted for Mn (for instance, Ni) as well as to insertion compounds wherein only lithium has been substituted for Mn. For the latter, we have discovered empirically that the relationship between $T_c$ and x is approximately given by the equation: $T_c=(850-1250*x)°$ C.

A preferred range for x in $Li_{1+x}Mn_{2-x}O_4$ is from greater than about 0.05 to less than about 0.2. Accordingly, a preferred range for the final reaction temperature is from greater than about 400° C. to less than about 790° C.

A preferred intermediate reaction temperature is about 900° C. in order to obtain low surface area product. The mixing temperature for the final stoichiometric mixture can be ambient temperature, although the final reactant lithium salt can be mixed in at elevated temperature if that is preferred.

In the method of the invention, the intermediate reactant manganese compound can be electrolytic manganese dioxide. The intermediate reactant lithium salt can be $Li_2CO_3$. The final reactant lithium salt can be a member selected from the group consisting of LiCl, LiF, and $Li_2CO_3$.

Another discovery was made when using LiCl as a reactant in the aforementioned synthesis. Unexpected capacity retention results were obtained upon repeated cycling for insertion compounds prepared using this lithium halide salt. Thus, the invention additionally includes a method for making the aforementioned insertion compound $Li_{1+x}Mn_{2-x-y}M_yO_4$ comprising heating a final stoichiometric mixture of LiCl and a final reactant manganese compound at a final reaction temperature in the range from greater than about 400° C. to less than about $T_c$.

Specifically, the use of LiCl can be beneficial for preparing the insertion compound $Li_{1+x}Mn_{2-x}O_4$. In this case, $T_c$ can be approximately given by the equation: $T_c=(850-1250*x)°$ C. A preferred range for x is from greater than about 0.1 to less than about 0.2. Accordingly, a preferred range for the final reaction temperature is from greater than about 400° C. to less than about 725° C. In this method, the final stoichiometric mixture can be heated at the final reaction temperature for at least 18 hours. The lattice parameter of such insertion compounds can be in the range from greater than about 8.18 Å to less than about 8.22 Å.

Consequently, LiCl can be advantageously used to prepare $Li_{1+x}Mn_{2-x-y}M_yO_4$ from an insertion compound intermediate having the approximate formula $Li_1Mn_{2-y}M_yO_4$ and a spinel-phase like crystal structure wherein the insertion compound intermediate is prepared by heating an intermediate stoichiometric mixture comprising an intermediate reactant lithium salt and an intermediate reactant manganese compound at an intermediate reaction temperature greater than $T_c$ but less than about 900° C.

Insertion compounds prepared by a method of the invention are particularly suitable for use a cathode in a lithium battery wherein the battery typically comprises a lithium compound anode and an electrolyte comprising a solvent and a lithium electrolyte salt. Therein, the lithium compound anode can be carbonaceous. The lithium electrolyte salt can be selected from the group consisting of $LiBF_4$ and $LiPF_6$. The solvent can comprise ethylene carbonate and additionally another carbonate solvent selected from the group consisting of propylene carbonate, diethyl carbonate, and dimethyl carbonate.

The invention is directed to a method for making an insertion compound having the formula $Li_{1+x}Mn_{2-x-y}M_yO_4$ wherein M is a transition metal, x is a number greater than zero and less than 0.33, y is a number greater than or equal to zero and less than about 1, the insertion compound having a spinel-phase crystal structure and a maximum critical temperature for phase stability $T_c$, comprising selecting a process from the group consisting of: (a) (1) obtaining an insertion compound intermediate having the approximate formula $Li_1Mn_{2-y}M_yO_4$ and a spinel-phase crystal structure wherein the insertion compound intermediate is prepared by heating an intermediate stoichiometric mixture of an intermediate reactant lithium salt and an intermediate reactant manganese compound at an intermediate reaction temperature in the range from greater than $T_c$ but less than about 900° C.; (2) making a final stoichiometric mixture of the insertion compound intermediate and a final reactant lithium salt at a mixing temperature less than $T_c$; and (3) heating the final stoichiometric mixture at a final reaction temperature in the range from greater than about 400° C. to less than about $T_c$; or (b) heating a final stoichiometric mixture of LiCl and a final reactant manganese compound at a final reaction temperature in the range from greater than about 400° C. to less than about $T_c$.

BRIEF DESCRIPTION OF THE DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Figure 1:
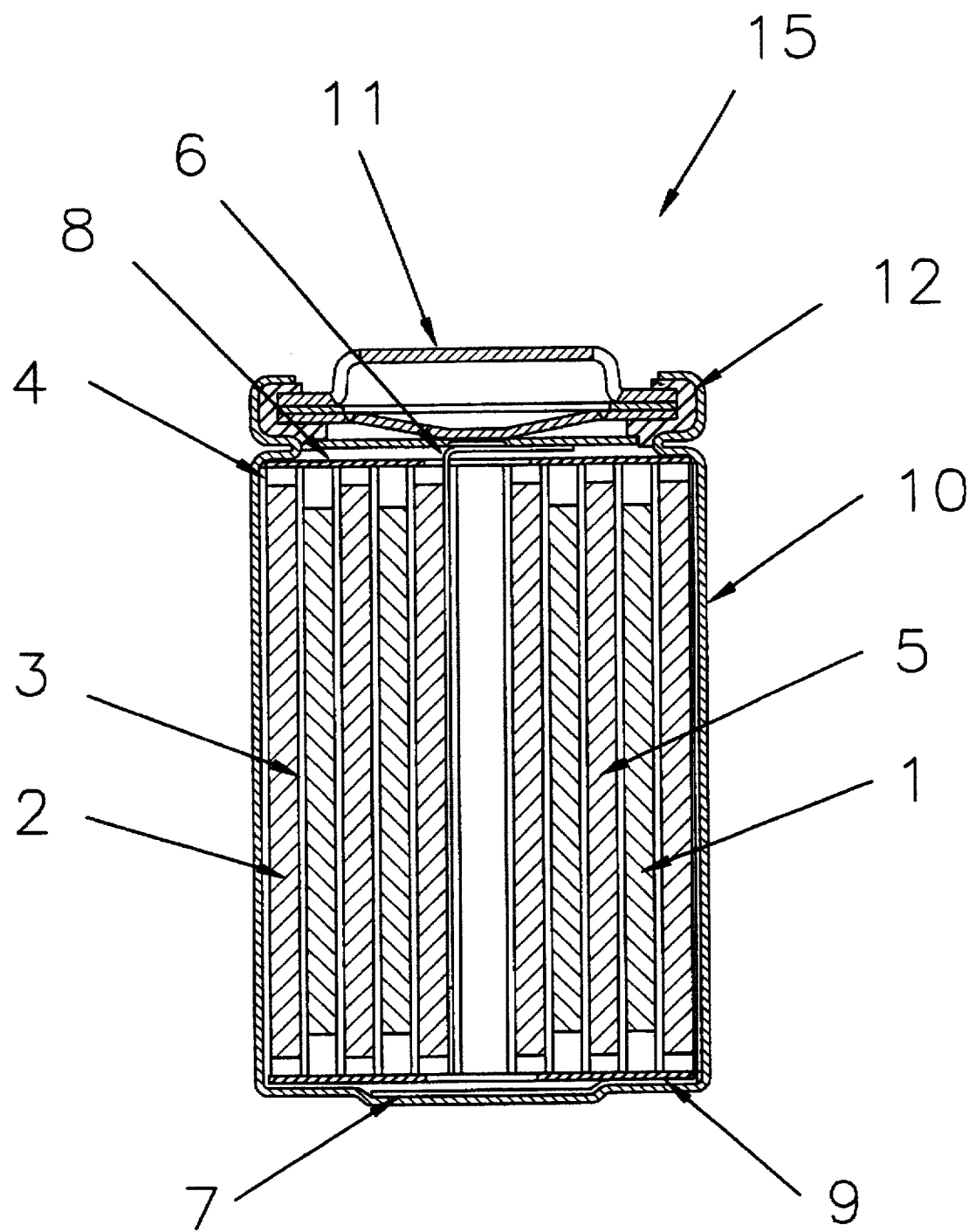
FIG. 1 depicts a cross-sectional view of a preferred embodiment of a cylindrical spiral-wound lithium ion battery.

The method of the invention pertains to spinel-phase insertion compounds having the formula $Li_{1+x}Mn_{2-x-y}M_yO_4$ wherein M is a transition metal, x is a number greater than zero and less than 0.33, and y is a number greater than or equal to zero and less than about 1. Herein, the term spinel-phase refers to crystal structures similar to that of $LiMn_2O_4$ which has an ideal spinel structure of space group Fd3m with Li atoms in 8a sites, Mn atoms in 16d sites, and oxygen atoms in 32e sites.

These insertion compounds are typically prepared in powder form. Generally, the associated crystal growth processes proceed faster at higher temperature thus making it desirable to use the highest possible reaction temperatures. However, several phase transitions occur in $Li_{1+x}Mn_{2-x-y}M_yO_4$ as a function of x, temperature, and surrounding oxygen partial pressure. These transitions involve mixed phase regions which should be avoided if high-quality single-phase $Li_{1+x}Mn_{2-x-y}M_yO_4$ samples are to be synthesized. Thus, the insertion compounds have a maximum critical temperature for phase stability, $T_c$. Predominantly single phase compounds therefore are prepared at temperatures below $T_c$. Generally however, the lower the temperature used in such preparation, the greater the surface area of the prepared powdered compound. The two step heating method of the invention allows the preparation of predominantly single phase compounds with relatively small surface areas (ie. having surface areas similar to powders prepared at temperatures above $T_c$).

In general, the method of the invention comprises: obtaining an insertion compound intermediate having the approximate formula $Li_1Mn_{2-y}M_yO_4$ and a spinel-phase crystal structure wherein the insertion compound intermediate is prepared by heating an intermediate stoichiometric mixture of an intermediate reactant lithium salt and an intermediate reactant manganese compound at an intermediate reaction temperature in the range from greater than $T_c$ but less than about 900° C.; making a final stoichiometric mixture of the insertion compound intermediate and a final reactant lithium salt at a mixing temperature less than $T_c$; and heating the final stoichiometric mixture at a final reaction temperature in the range from greater than about 400° C. to less than about $T_c$. The formation of unwanted phases is avoided (eg. like $Li_2MnO_3$ which is not entirely eliminated during the slow cooling methods of the prior art).

Since the insertion compound intermediates are solid solutions, a continuous range of stoichiometries can exist. Accordingly, compounds can exist that have similar but not identical stoichiometries and yet can still be expected to function as an intermediate in an equivalent manner for purposes of the method. Certain insertion compound intermediates are commercially available (eg. $Li_1Mn_2O_4$). Other insertion compounds wherein M is Ni, Co, Cr, and the like (up to y=1) have been synthesized by various researchers in the art. (It should be noted that the stoichiometries of these insertion compounds can be difficult to determine precisely. The oxygen content therein is particularly difficult to measure directly. Additionally, the presence of other impurity phases complicates such a determination. Accordingly, the typical stoichiometry cited represents a reasonable approximation based on a particular set of assumptions.)

Preparing such intermediates at higher temperatures produces a product with lower surface area. However, about 900° C., the intermediate begins to decompose. Thus, the upper temperature limit for this heating step is about 900° C.

The maximum critical temperature for phase stability $T_c$ be determined from thermal gravimetric analysis (TGA) on conventionally prepared $Li_{1+x}Mn_{2-x-y}M_yO_4$ in a manner similar to that shown in the Illustrative Examples to follow (the first weight-loss kink in the TGA data). For reasons that are not fully understood, the surface area of the intermediate does not increase significantly after the final (second) mixing and heating step. Thus, the surface area of the product powder is kept similar to that obtained after the first heating step. The second step serves to add excess lithium (x) to the compound without exceeding $T_c$.

While various other transition metals can be substituted for Mn, a preferred composition for use as a cathode in lithium batteries is $Li_{1+x}Mn_{2-x}O_4$ wherein x ranges from greater than about 0.05 to less than about 0.2. The higher the value of x, the better the cycling characteristics of the cathode. However, the higher the value of x, the lower the initial capacity of the cathode. Thus, for such applications, a tradeoff must be made. As we have discovered for these materials, $T_c$ and x are approximately related by the equation: $T_c=(850-1250*x)°$ C. when heated in air. This corresponds to a preferred upper limit of less than about 790° C. for the final reaction temperature. As shown from coin cell battery testing in the inventive Examples following, desirable cathode materials can be prepared at second heating temperatures as low as about 400° C.

Since a thorough mixing of the final reactant salt and the insertion compound intermediate is required before the second heating, it is generally expected that this will be done at ambient temperature. However, mixing at elevated temperature, while being a more difficult operation, saves a cooling/reheating step and may therefore be preferred overall.

The heating steps must be sufficiently long such that the various solid state reactions are substantially completed. Heating time scales of order of 18 hours can be sufficient. For even better product homogeneity, additional steps involving multiple mixing/re-heating steps can be considered. During the heating steps, an oxygen containing atmosphere is maintained over the reactants. Consideration must be given to the partial pressure of oxygen present since this has an effect on the associated phase transition temperatures (see the aforementioned reference of Yamada et al.).

The intermediate reactant manganese compound can be any suitable conventional manganese oxide (e.g. electrolytic manganese dioxide is common, commercially available, and of battery grade purity). The intermediate reactant lithium salt often used is $Li_2CO_3$ but can be one of many common alternative salts instead (eg. LiOH, etc.). Similarly, the final reactant lithium salt can be one of many common alternative salts. Historically, lithium halide salts (such as LiCl or LiF) have not typically been used for such syntheses. However, not only can such halide salts be successfully used, but they can be particularly suitable for use in the low temperature reaction range of the invention (ie. as low as 400° C.). Additionally, the use of LiCl seems to result in unexpected cycling advantages for products used in battery applications.

In the Inventive Examples pertaining to coin cell batteries below, the cycling characteristics of $Li_{1+x}Mn_{2-x}O_4$ prepared using LiCl were unexpectedly better than those prepared using $Li_2CO_3$ over x values ranging from greater than about 0.1 to less than about 0.2. The corresponding range for the final reaction temperature was thus from greater than about 400° C. to less than about 725° C. The lattice parameter of such insertion compounds was in the range from greater than about 8.18 Å to less than about 8.22 Å.

The processes affecting the formation of surfaces in these compounds is not well understood. Thus, it is unclear why the surface area is not substantially increased during the low temperature reaction step of the instant method. Additionally, it is unclear why the use of a LiCl reactant salt would lead to cycling benefits.

Battery embodiments of the invention can comprise the aforementioned insertion compounds as a cathode material. Various electrochemistries and battery configurations are possible. For instance, the batteries can have lithium metal, lithium alloy, and/or lithium insertion compound anodes. Various non-aqueous or possibly aqueous liquid or solid polymer type electrolytes can be used. Product configurations include prismatic formats and miniature coin cells.

A preferred construction for a lithium ion type battery is depicted in the cross-sectional view of a conventional spiral-wound battery as illustrated in FIG. 1. A jelly roll 4 is created by spirally winding a cathode foil 1, an anode foil 2, and two microporous polyolefin sheets 3 that act as separators.

Cathode foils are prepared by applying a mixture of powdered (about 10 micron size typically) $Li_{1+x}Mn_{2-x-y}M_yO_4$ prepared by the method of the invention, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered (also typically about 10 micron size) carbonaceous insertion compound is used instead of the cathode material and thin copper foil is usually used instead of aluminum. Anode foils are typically slightly wider than the cathode foils in order to ensure that anode foil is always opposite cathode foil.

The jelly roll 4 is inserted into a conventional battery can 10. A header 11 and gasket 12 are used to seal the battery 15. The header may include safety devices if desired. A combination safety vent and pressure operated disconnect device may be employed. FIG. 1 shows one such combination that is described in detail in Canadian Patent Application No. 2,099,657, filed Jun. 25, 1993, entitled "Electrochemical Cell and Method of Manufacturing Same". Additionally, a positive thermal coefficient device (PTC) may be incorporated into the header to limit the short circuit current capability of the battery. The external surface of the header 11 is used as the positive terminal, while the external surface of the can 10 serves as the negative terminal.

Appropriate cathode tab 6 and anode tab 7 connections are made to connect the internal electrodes to the external terminals. Appropriate insulating pieces 8 and 9 may be inserted to prevent the possibility of internal shorting. Prior to crimping the header 11 to the can 10 in order to seal the battery, a suitable non-aqueous electrolyte 5 is added to fill the porous spaces in the jelly roll 4. Typically, the electrolyte comprises a lithium salt such as $LiBF_4$ or $LiPF_6$ in a solvent mixture of ethylene carbonate and other linear or cyclic esters such as propylene carbonate or diethyl carbonate.

Those skilled in the art will understand that the types of and amounts of the component materials must be chosen based on component material properties and the desired performance and safety requirements. For instance, in this case, a tradeoff between initial capacity and cycling performance must be made. The former is greater for lower values of x, while the latter is better for greater values of x.

Cylindrical batteries comprising $Li_{1.067}Mn_{1.933}O_4$ cathode material represent one possible satisfactory embodiment of the invention for commercial applications. In such an embodiment, $Li_{1.067}Mn_{1.933}O_4$ be prepared using electrolytic manganese dioxide (EMD) and $Li_2CO_3$ starting materials to first prepare an intermediate stoichiometric mixture in a ratio of 1 Li per 2 Mn. A suitable heat treatment procedure can involve ramping the treatment temperature from 100° C. to 900° C. over 15 hours, soaking at 900° C. for 12 hours, cooling to 100° C. over 15 hours, and then removing the intermediate product. Additional $Li_2CO_3$ can then be mixed in with the intermediate product so as to make a final stoichiometric mixture in a ratio of 1.1 Li per 2 Mn. Further heat treatment follows that can involve ramping the temperature from 100° C. to 750° C. over 10 hours, soaking at 750° C. for 4 hours, cooling to 100° C. over 10 hours, and then removing the product. The homogeneity of the batch can be improved by using additional heat treatment iterations. (ie. The product can be remixed and heat treated again, for instance, by ramping from 100° C. to 750° C. over 10 hours, soaking at 750° C. for 12 hours, cooling to 100° C. over 10 hours, and then removing the final product.) The final stoichiometry can thus be $Li_{1.067}Mn_{1.933}O_4$. This product is thus a suitable cathode material in such a battery embodiment. The anode material therein can be mesocarbon microbead carbonaceous material graphitized at about 2650° C. The electrolyte can be 1 M $LiPF_6$ in ethylene carbonate (EC)/diethyl carbonate (DEC) in a 30/70 volume ratio. However, many embodiments other than the preceding can also be satisfactory for commercial applications.

The following Examples are provided to illustrate certain aspects of the invention but should not be construed as limiting in any way.

Where indicated, thermal gravimetric analysis (TGA) experiments were performed using a TA instruments TGA51 analyzer. A thin alumina plate was used for the sample holder in the TGA apparatus because alumina shows little reactivity with $Li_{1+x}Mn_{2-x}O_4$ below 1000° C. The samples were heated and cooled at 2° C./min in a constant flow (10 cc/min) of extra dry air.

Where indicated, powder x-ray diffraction measurements were made using a Seimens D5000 diffractometer equipped with a copper target x-ray tube and a diffracted-beam monochromator. The data was analyzed using Hill and Howard's version of the Rietveld program and the lattice constants were determined. All specimens were measured from 10° to 120° in scattering angle and each data collection took 15 hours.

With regards to stoichiometry, unless otherwise indicated, it was assumed that prepared insertion compounds were single phase (pure) compounds. The lithium and transition metal contents were derived from the amounts present in the reactant materials. Then, valence arguments were used to determine oxygen content.

BET surface areas were determined using conventional single point BET methods using a nitrogen/helium (30%/70%) gas mixture. However, samples were first outgassed at 140° C. for 20 minutes under a constant flow of the nitrogen/helium gas mixture. Then nitrogen was adsorbed/desorbed twice before making the BET measurement.

Illustrative Example 1

Various $Li_1Mn_2O_4$ samples were synthesized at different temperatures in the following manner. $Li_2CO_3$ (FMC Corp.) and electrolytic manganese dioxide (EMD, Mitsui TAD 1 grade, 59.7% Mn by weight) were thoroughly mixed in the ratio corresponding to 1 Li per 2 Mn. A small quantity of this mixture was then heated at different temperatures between 700° and 900° C. for 12 hours in extra dry air. The BET surface area for each sample was measured and is shown in Table 1.

TABLE 1

Surface area of $Li_1Mn_2O_4$ samples synthesized at different temperatures

| Temperature (°C.) | BET Surface Area (m²/g) |
| --- | --- |
| 900 | 0.262 |
| 850 | 0.386 |
| 800 | 0.499 |
| 750 | 0.576 |
| 700 | 0.824 |

The surface area of the samples can be seen to increase substantially as the synthesis temperature is reduced.

Illustrative Example 2

Figure 2:
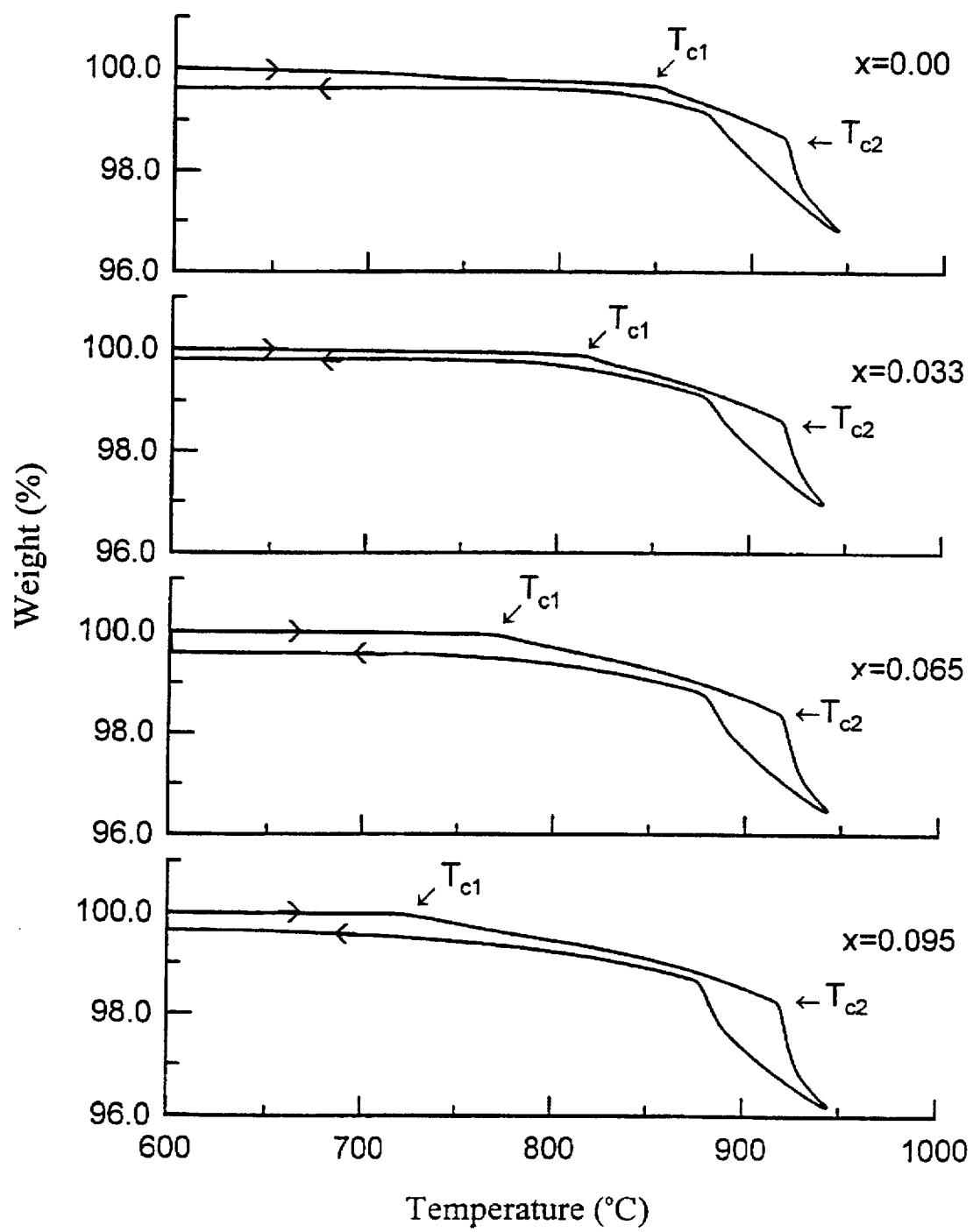
FIG. 2 shows thermal gravimetric analysis data curves for certain $Li_{1+x}Mn_{2-x}O_4$ samples (series A) mentioned in Illustrative Example 2. The transitions $T_{c1}$ and $T_{c2}$ are indicated with arrows.

In the aforementioned article by the inventors, Y. Gao et al., Applied Physics Letters 66, 2487 (1995), thermal gravimetric analysis (TGA) measurements were performed on $Li_{1+x}Mn_{2-x}O_4$ samples wherein x=0.0, 0.033, 0.065 and 0.095 (series A) in air at a heating rate of 2° C./min. For illustrative purposes, FIG. 2 shows these TGA measurements. Two weight-loss kinks can be observed in the curves. The temperature at which the first occurs, called $T_{c1}$, depends on x, while the temperature at which the second occurs, called $T_{c2}$, does not. The transitions $T_{c1}$ and $T_{c2}$ are indicated with arrows.

Figure 3:
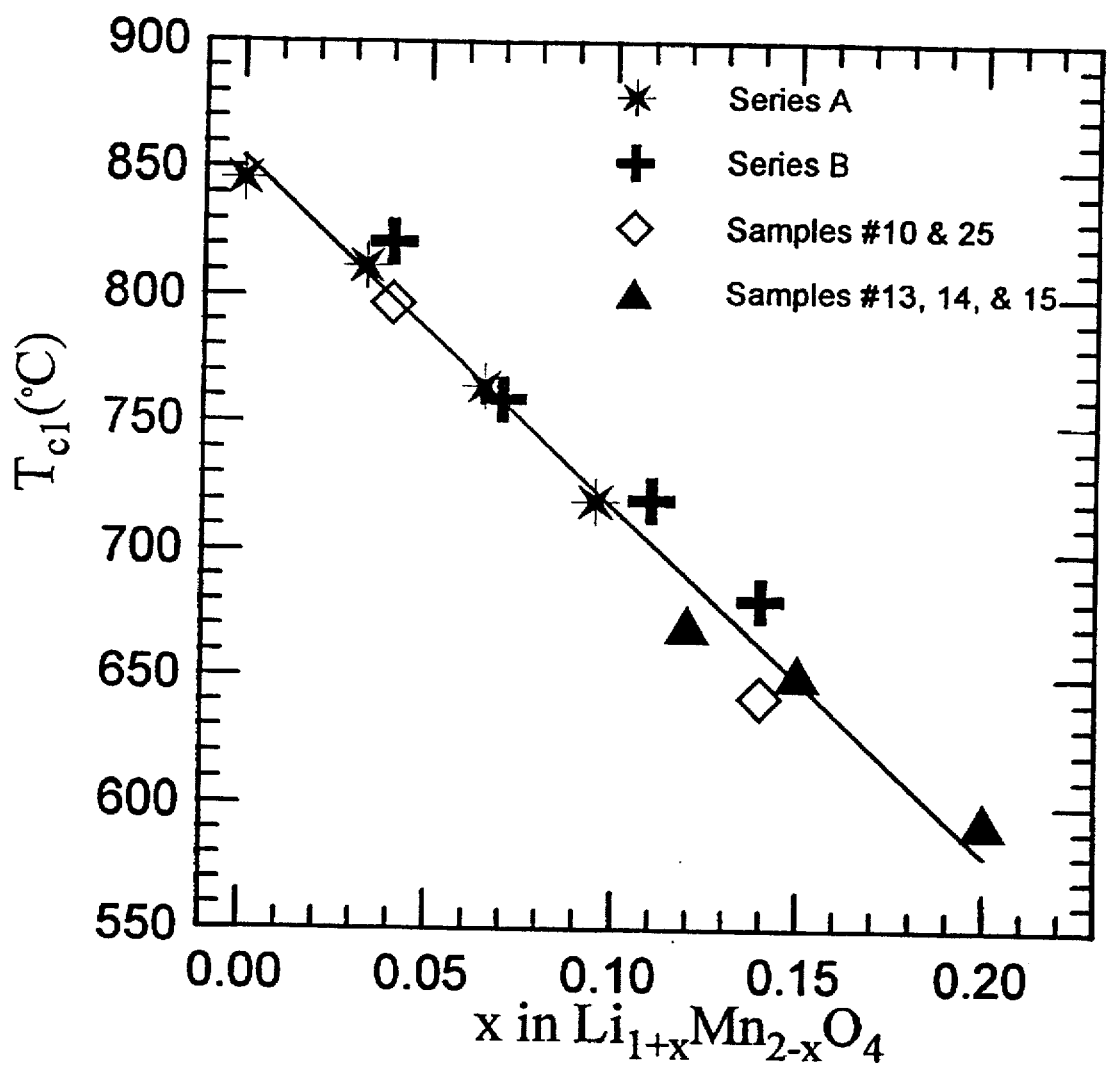
FIG. 3 plots the transition temperature $T_{c1}$ versus x in certain $Li_{1+x}Mn_{2-x}O_4$ samples (series A and B) mentioned in Illustrative Example 2. Also included is data from sample #'s 10, 13, 14, 15, and 25 in the Inventive Example pertaining to coin cell batteries.
Figure 4:
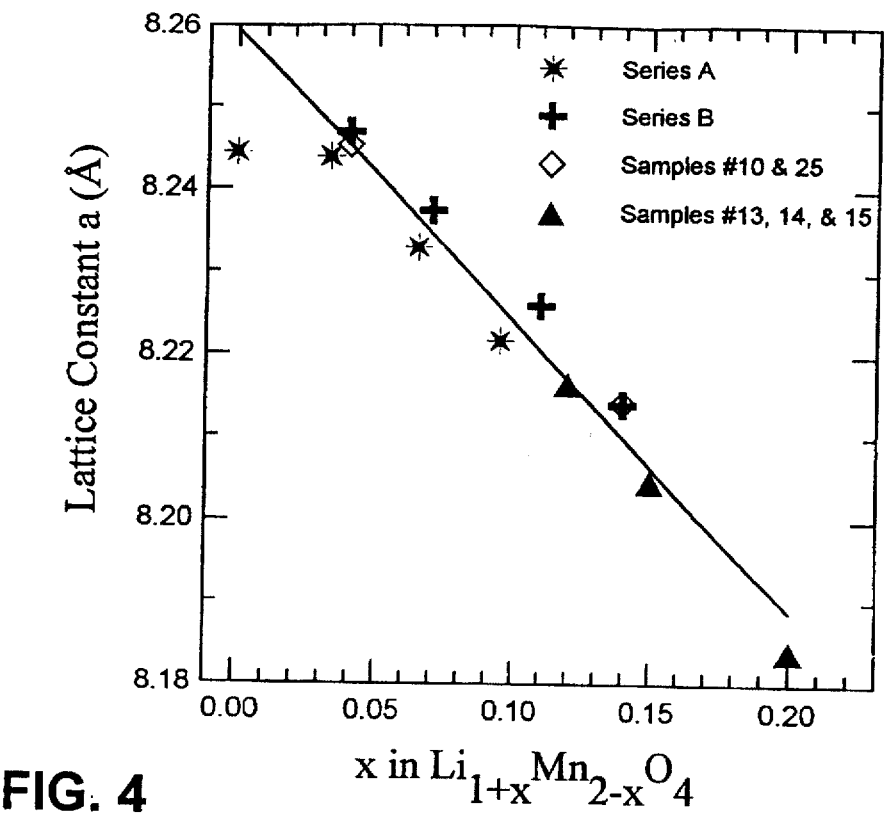
FIG. 4 plots the lattice constant, a, versus x in certain $Li_{1+x}Mn_{2-x}O_4$ samples (series A and B) mentioned in Illustrative Example 2. Also included is data from sample #'s 10, 13, 14, 15, and 25 in the Inventive Example pertaining to coin cell batteries.

FIG. 3 shows a graph of $T_{c1}$ versus x for the $Li_{1+x}Mn_{2-x}O_4$ samples (series A and B) in the Y. Gao et al. article. (Also included is data from sample #'s 10, 13, 14, 15, and 25 in the Inventive Example pertaining to coin cell batteries.) The relationship is linear and is approximately given by the equation: $T_c=(850-1250^* x)°$ C. FIG. 4 shows a graph of the cubic lattice constant a (as determined by x-ray diffraction) for the same $Li_{1+x}Mn_{2-x}O_4$ samples versus x. Both $T_{c1}$ and a decrease with x in $Li_{1+x}Mn_{2-x}O_4$.

Figure 5:
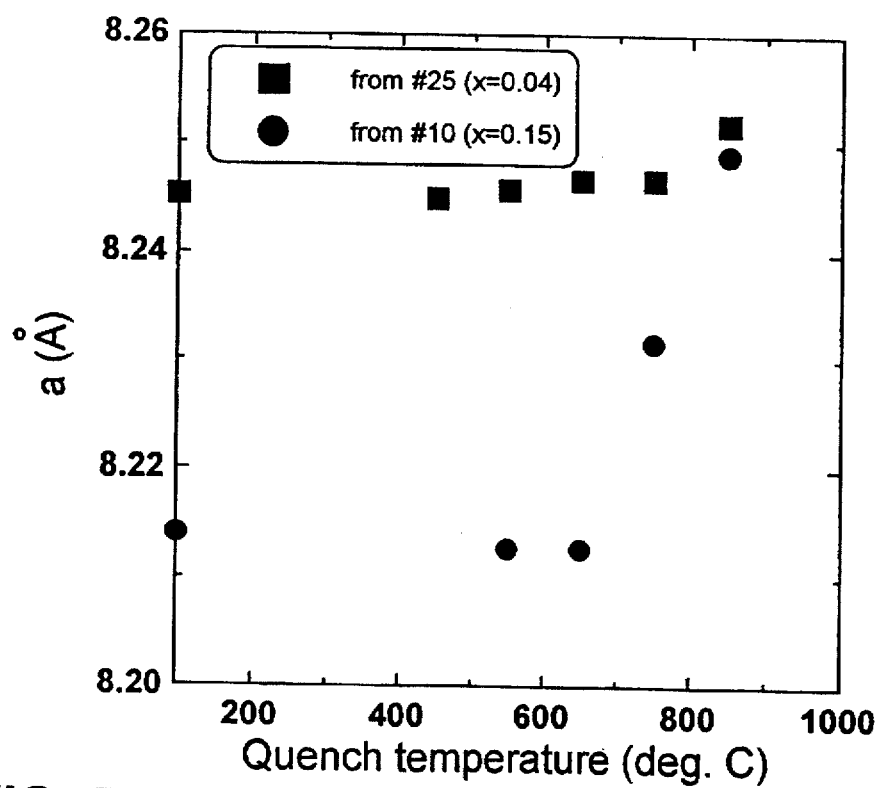
FIG. 5 plots the lattice constant, a, versus quenching temperature after quenching $Li_{1+x}Mn_{2-x}O_4$ samples having x=0.04 and x=0.14 as described in Illustrative Example 2.
Figure 6:
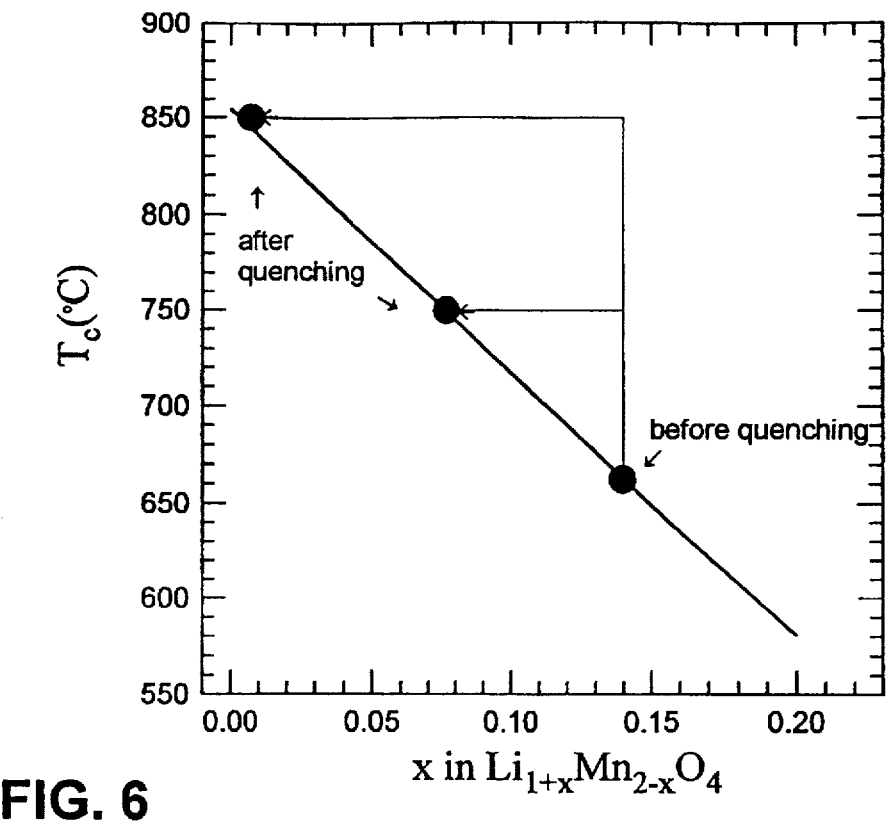
FIG. 6 qualitatively shows graphically the effect of quenching on a $Li_{1+x}Mn_{2-x}O_4$ sample having x=0.14 as described in Illustrative Example 2.

To examine the structure changes at the transition, further x-ray diffraction studies were performed on two of these samples, #25 wherein x=0.04 and #10 wherein x=0.14, by reheating to temperatures above and below $T_{c1}$ followed by rapid quenching (ie, quick cooling) thereafter. For samples quenched from below $T_{c1}$, the cubic lattice constant and the diffraction profile did not change. For samples quenched from above $T_{c1}$, the cubic lattice constant increased and weak diffraction peaks from $Li_2MnO_3$ could be observed. FIG. 5 shows the dependence of the lattice constant of these samples on quenching temperature. The lattice constant begins to shift for quenching temperatures above $T_{c1}$; These observations are consistent with the occurrence of the following hypothesized reaction above $T_{c1}$,

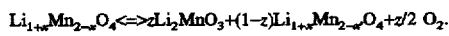

where $z=(x-x')/(1-x')$, $x'=(x-z)/(1-z)$ and $x'<x$. Above $T_{c1}$, x' is given by that value obtained by projecting to the $T_{c1}$ verses x curve in FIG. 3 at the sample temperature. This is illustrated in FIG. 6, which shows the predicted stoichiometry of samples prepared by quenching $Li_{1+x}Mn_{2-x}O_4$ samples having x=0.14 from either 750° C. or 850° C. A stoichiometry for the spinel phase wherein x'=0.075 is predicted for the material quenched from 750° C. and a stoichiometry wherein x'=0.01 is predicted for the material quenched from 850° C. The lattice constants of the quenched samples at these temperatures are shown in FIG. 5, which agree well with those expected for samples with x=0.075 and x=0.01 respectively from FIG. 4.

Thus, it appears that the $T_{c1}$ versus x curve represents the maximum composition of lithium that a single-phase $Li_{1+x}Mn_{2-x}O_4$ material can have at a given temperature in air. In the nomenclature herein, $T_{c1}$ is therefore $T_c$, the maximum critical temperature for phase stability. Materials with overall composition x, heated to temperatures greater than $T_{c1}$ and less than $T_{c2}$ are mixtures of $Li_2MnO_3$ and $Li_{1+x'}Mn_{2-x'}O_4$ with x' given by the projection to the $T_{c1}$ versus x curve (FIG. 3) at the sample temperature. The $T_{c1}$ versus x curve shifts to lower temperature when the $O_2$ partial pressure is reduced and it shifts to higher temperature when the $O_2$ partial pressure is increased, as can be inferred from the results of Yamada et al.

Illustrative Example 3

Figure 7:
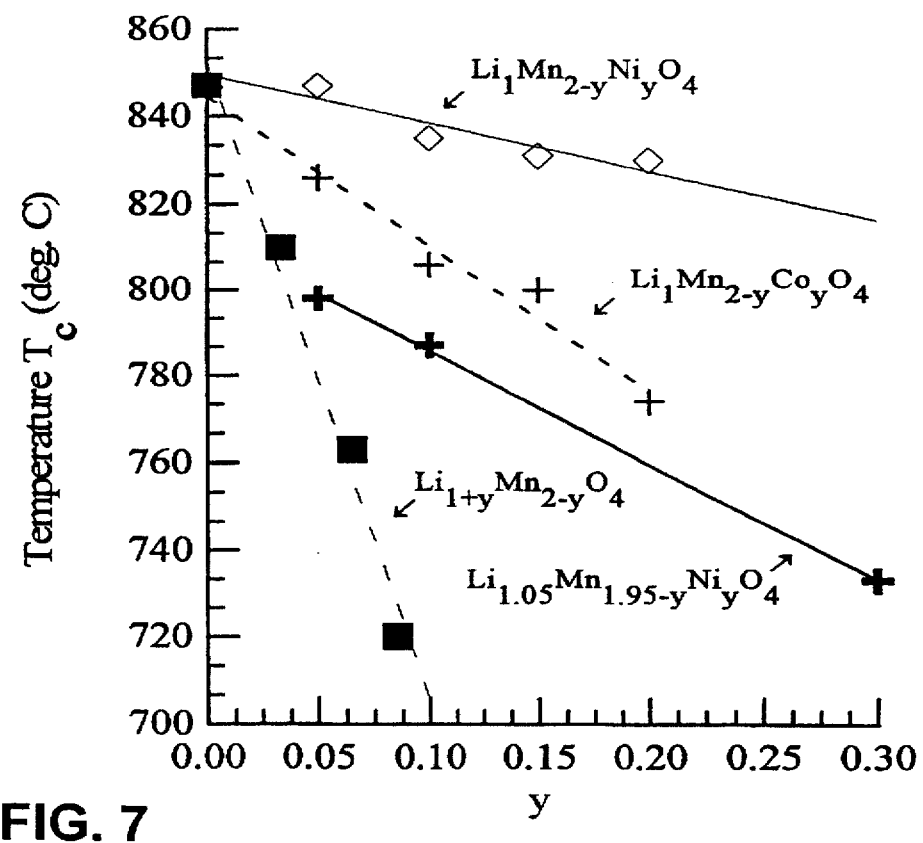
FIG. 7 shows plots of the temperature $T_c$ versus x for each series of compounds in Illustrative Example 3. Also shown is a plot of $Li_{1+x}Mn_{2-x}O_4$ data from Illustrative Example 2 for comparison.

Three series of $Li_{1+x}Mn_{2-x-y}M_yO_4$ samples were prepared wherein variable amounts of either Ni or Co were substituted for Mn (ie. y variable and >0 and M=Ni or Co). In all cases, stoichiometric mixtures of EMD, LiOH, and either $Co(NO_3)_2 \cdot 6H_2O$ or $Ni(NO_3)_2 \cdot 6H_2O$ were preheated first at 750° C. for 4 hours. The product was then remixed and reheated at 750° C. for 12 hours. All heatings were performed in extra dry air. The three series had the stoichiometries $Li_1Mn_{2-y}Co_yO_4$, $Li_1Mn_{2-y}Ni_yO_4$, and $Li_{1.05}Mn_{1.95-y}Ni_yO_4$. TGA data was obtained on these series in a manner similar to Illustrative Example 2. Similarly shaped data curves were observed from which $T_{c1}$ (or $T_c$) values were derived as in Illustrative Example 2. FIG. 7 shows plots of the temperature $T_c$ versus y for each series. Also shown is a plot of $Li_{1+y}Mn_{2-y}O_4$ data from Illustrative Example 2 for comparison.

As can be seen in FIG. 7, $T_c$ decreases roughly linearly when any of the elements Li, Ni, or Co are substituted for Mn. However, the slope of the decrease depends on the element substituted. Additionally, the $T_c$ curve for the $Li_{1.05}Mn_{1.95-y}Ni_yO_4$ series is shifted to lower temperatures compared to that for the $Li_1Mn_{2-y}Ni_yO_4$ series. Thus, the effect of increased lithium substitution in the insertion compounds $Li_{1+x}Mn_{2-x-y}Ni_yO_4$ appears similar to that in the insertion compounds $Li_{1+x}Mn_{2-x}O_4$ (no substituted transition metals) of Illustrative Example 2. Therefore the method of the invention can be expected to apply to such transition metal substituted insertion compounds in a like manner.

Inventive Examples: coin cell batteries

Various $Li_{1+x}Mn_{2-x}O_4$ samples were synthesized in the following two step manner. First, $Li_2CO_3$ (FMC Corp. and electrolytic manganese dioxide (EMD, Mitsui TAD 1 grade, 59.7% Mn by weight) were thoroughly mixed in the ratio corresponding to 1 Li per 2 Mn. About 40 grams of this mixture was then heated to an intermediate reaction temperature, $T_I$, soaked for 18 hours and then cooled to room temperature in about 2 hours. The heatings were made in an alumina boat placed within a horizontal tube furnace in air. Portions of this product were then mixed with an excess amount of a Li salt calculated to give the desired final value of x in $Li_{1+x}Mn_{2-x}O_4$. This mixture was then heated to a final reaction temperature, $T_F$, soaked for 18 hours and then cooled to room temperature at a rate of 50° C./hour. Where indicated, TGA and x-ray diffraction analyses were performed on these samples to determine $T_c$ and a.

Laboratory coin cell batteries were used to determine electrochemical characteristics of each insertion compound sample against a lithium metal anode. These coin cell batteries were assembled using conventional 2325 hardware as described in J. R. Dahn et al, Electrochimica Acta, 38, 1179 (1993). A stainless steel cap and special oxidation resistant case comprise the container and also serve as negative and positive terminals respectively. A gasket was used as a seal which also served to separate the two terminals. Mechanical pressure was applied to a stack comprising a lithium anode, separator, and cathode by means of mild steel disc spring and stainless disc. The disc spring was selected such that a pressure of about 15 bar was applied following closure of the battery. 125 μm thick metal foil was used as a lithium anode. Celgard 2500 microporous polypropylene film was used as the separator. Several different types of electrolytes were used. These were solutions of 1.0 M $LiBF_4$ salt dissolved in solvent mixtures of either EC (ethylene carbonate) and PC (propylene carbonate) in a volume ratio of 50/50 respectively, EC and DEC (diethyl carbonate) in a volume ratio of 30/70 respectively, or EC, PC, and DMC (dimethyl carbonate) in a volume ratio of 25/25/50 respectively.

Cathodes for the laboratory coin cell batteries were made by uniformly coating a 20 μm thick aluminum foil substrate with a blend containing a mixture of insertion compound powder, Super S (product of Ensagri) carbon black conductive dilutant, and ethylene propylene diene monomer (EPDM) binder. This was accomplished by initially making a slurry containing cyclohexane solvent wherein the insertion compound powder and carbon black mixture (88 and 10 parts by weight respectively) were added to an appropriate amount of binder solution containing 4% EPDM in cyclohexane, such that 2% of the final dried electrode mass would be EPDM. Excess cyclohexane was then added until the slurry viscosity was like that of a syrup, whereupon the slurry was then coated onto the foil using a doctor blade spreader. Cyclohexane was then evaporated away at room temperature in air. After drying, the electrode was compacted between flat plates at about 120 bar pressure. Square shaped cathodes (1.2 cm sides) were then cut from this larger electrode using a precision cutting jig. The cathodes were typically between 100 and 200 micrometers in thickness. The cathode was then weighed and the active insertion compound mass present was obtained by subtracting the weight of Al foil, EPDM, and carbon black present.

Coin cell batteries were thermostatted at 55°±1° C. before testing and were then charged and discharged using constant current cyclers with ±1% current stability between 3.0 and 4.3 volts. Current densities were adjusted to be equivalent to ±14.8 mA/g active mass. Data was logged whenever the cell voltage changed by more than 0.01 V. Most of the capacity versus cycle number curves showed a linear decrease of capacity with cycle number. Thus, capacity fade rates were calculated from the slope of the capacity versus cycle number graphs over the range from zero to 25 cycles.

Physical and electrochemical characteristics for these various $Li_{1+x}Mn_{2-x}O_4$ samples are summarized in Table 2. Included therein is data for a sample (#1) made using a recipe approximating the teachings of the prior art and also a commercially available $Li_{1+x}Mn_{2-x}O_4$ product (sample #16).

TABLE 2

Summary of physical and electrochemical characteristics for samples used in coin cell batteries

| Sample # | x | $T_I$ (°C.) | $T_F$ (°C.) | Excess Li salt | a axis (Å) | BET ($m^2/g$) | $T_c$ (°C.) | Solvents | Capacity (mAh/g) | Fade rate %/cyc. |
|---|---|---|---|---|---|---|---|---|---|---|
| 1 | 0.095 | 750 | 750 | $Li_2CO_3$ | 8.2217 | 0.8 | 719 | EC/PC | 112 | 0.3 |
| 2 | 0.15 | 750 | 600 | LiF | 8.2142 | 0.6 | 660 | EC/PC | 111 | 0.27 |
| 3 | 0.09 | 750 | 600 | LiF | 8.2249 | | 730 | EC/PC | 120 | 0.46 |
| 4 | 0.04 | 750 | 600 | LiF | 8.2389 | | 799 | EC/PC | 125 | 0.87 |
| 5 | 0.2 | 900 | 600 | LiF | 8.2101 | | 658 | EC/PC | 105 | 0.12 |
| 6 | 0.15 | 900 | 600 | LiF | 8.2140 | 0.27 | 665 | EC/PC | 112 | 0.12 |
| 7 | 0.2 | 900 | 600 | LiCl | 8.1923 | | 636 | EC/PC | 86 | 0.046 |
| 8 | 0.15 | 900 | 600 | LiCl | 8.2069 | | 667 | EC/PC | 100 | 0.069 |
| 9 | 0.12 | 900 | 600 | LiCl | 8.2172 | | 688 | EC/DEC | 116 | 0.31 |
| 10 | 0.14 | 900 | 750 | $Li_2CO_3$ | 8.2141 | | 650 | EC/PC | 100 | 0.23 |
| 11 | 0.2 | 900 | 600 | $Li_2CO_3$ | 8.1952 | | 603 | EC/PC | 93 | 0.14 |
| 12 | 0.2 | 900 | 500 | LiCl | 8.1865 | | 616 | EC/DEC | 77 | 0.064 |
| 13 | 0.15 | 900 | 500 | LiCl | 8.2054 | | 652 | EC/DEC | 105 | 0.123 |
| 14 | 0.2 | 900 | 400 | LiCl | 8.1854 | | 595 | EC/DEC | 84 | 0.072 |
| 15 | 0.12 | 900 | 400 | LiCl | 8.2164 | | 671 | EC/DEC | 112 | 0.305 |
| 16 | ? | ? | ? | ? | 8.2233 | | | EC/DEC | 125 | 0.21 |
| 17 | 0.15 | 875 | 600 | LiCl | 8.2054 | 1.16 | | EC/DEC | 102 | 0.101 |
| 18 | 0.15 | 850 | 600 | LiCl | 8.2091 | 0.99 | | EC/DEC | 106 | 0.119 |
| 19 | 0.15 | 825 | 600 | LiCl | 8.2057 | 1.59 | | EC/DEC | 109 | 0.108 |
| 20 | 0.15 | 800 | 600 | LiCl | 8.2066 | 1.5 | | EC/DEC | 102 | 0.131 |
| 21 | 0.12 | 875 | 600 | LiCl | 8.2163 | | | EC/DEC | 116 | 0.214 |
| 22 | 0.12 | 850 | 600 | LiCl | 8.2181 | | | EC/DEC | 120 | NA |
| 23 | 0.12 | 825 | 600 | LiCl | 8.2166 | | | EC/DEC | 114 | 0.198 |
| 24 | 0.12 | 800 | 600 | LiCl | 8.2169 | | | EC/DEC | 115 | 0.23 |
| 25 | 0.04 | 900 | 750 | $Li_2CO_3$ | 8.2453 | | 797 | EC/PC/DMC | 111 | NA |

The coin cell batteries comprising samples #1 (prior art recipe) and #16 (commercially available $Li_{1+x}Mn_{2-x}O_4$) show appreciable capacity loss with cycle number at 55° C. based on the fade rates indicated in Table 2.

Figure 8:
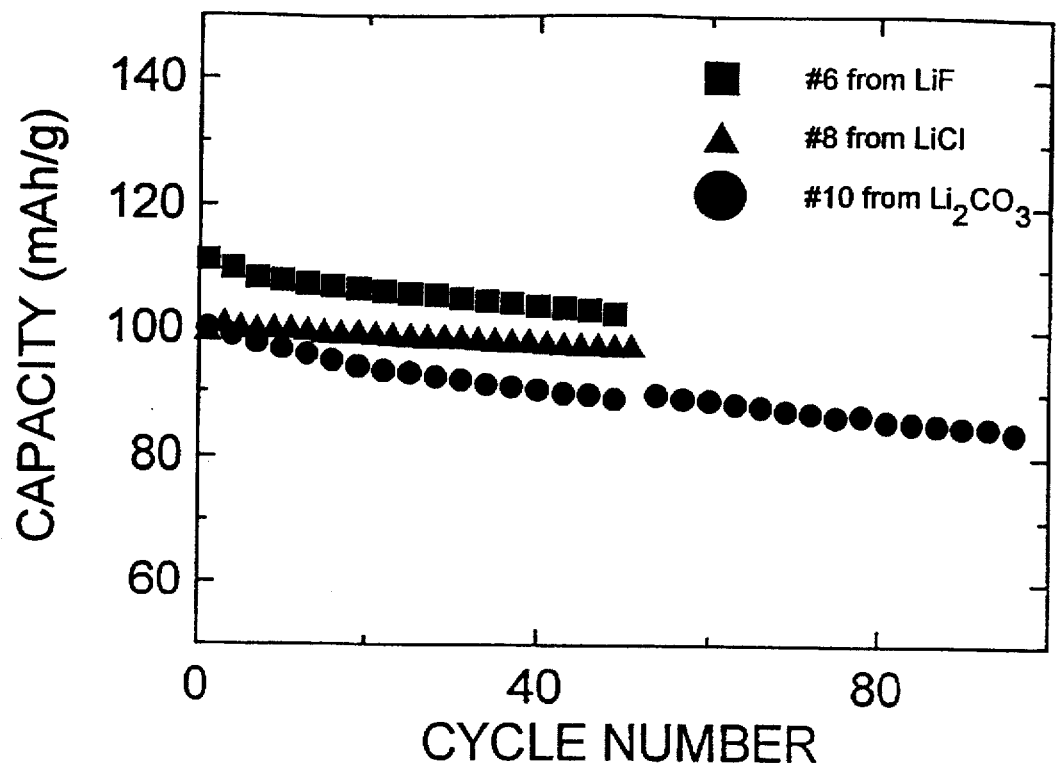
FIG. 8 shows the capacity versus cycle number data for sample #'s 6, 8, and 10 of the Inventive Example pertaining to coin cell batteries.

The coin cell batteries comprising samples #2, 3 and 4 (made using LiF as the source of excess Li) also show appreciable capacity loss with cycle number but illustrate how the fade rate decreases as x increases. FIG. 8 shows the capacity versus cycle number curves (fade) for coin cell batteries comprising samples #6, 8, and 10 (all of which have similar values of x but were made from different lithium salts). Sample #8 made with LiCl shows the smallest fade rate (Table 2). Comparing samples #6 and #2, both were prepared in a similar manner except for the first heating temperature. Sample #6, prepared at the higher temperature (900° C.) shows a smaller surface area and an improved fade rate.

Figure 9:
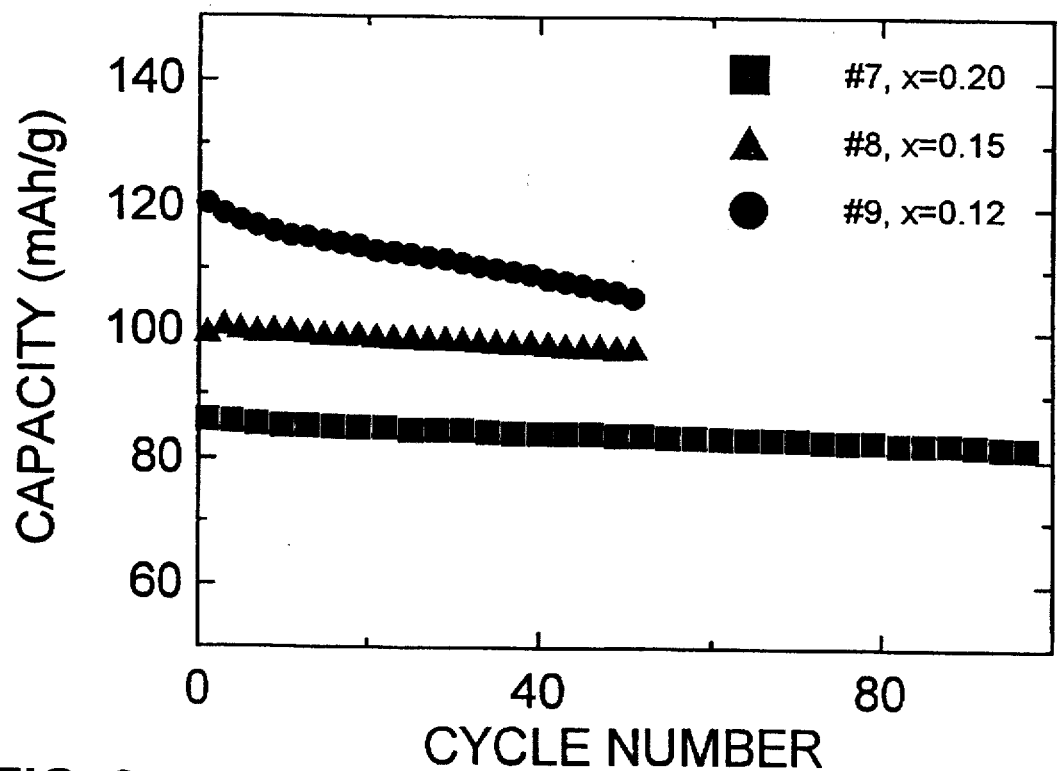
FIG. 9 shows the capacity versus cycle number data for sample #'s 7, 8, and 9 of the Inventive Example pertaining to coin cell batteries.

FIG. 9 shows the capacity versus cycle number curves for the coin cell batteries comprising samples #7, 8, and 9 (all prepared from LiCl). The samples with x=0.15 and 0.20 (#8 and 7) unexpectedly show very small fade rates (Table 2) when compared to similarly prepared samples from other salts (eg.LiF as in samples #5 and 6, or $Li_2CO_3$ as in sample #11). Again, fade rate increases with smaller x. However, the initial capacity is somewhat greater for smaller x.

Samples #7, 12, and 14 were prepared with x=0.20 from LiCl at temperatures of 600° C., 500° C., and 400° C. respectively. Coin cell batteries made from these samples all showed similar unexpectedly small fade rates. $Li_{1+x}Mn_{2-x}O_4$ with large x and hence excellent cycling characteristics can thus be prepared at quite low second heating temperatures.

The lattice constant, a, is thought to be a good measure of the actual amount of lithium that has been incorporated in the spinel phase, based on the preceding results shown in FIG. 4. Sample #5, made with x=0.2 from LiF salt, has a larger lattice constant, larger $T_{c1}$, and larger capacity than sample #7, made in a similar manner but from LiCl. It appears that there has been an incomplete reaction between the LiF and the spinel intermediate in the case of sample #5, while the reaction is complete for sample #7. Thus, the fade rate for sample #7 is expected to be less than that for sample #5, simply because sample #5 actually contains more Li. However, such arguments cannot be used to explain the difference between sample #11, made with $Li_2CO_3$, and samples #7 and #8, made with LiCl. The latter two samples "bracket" the first in lattice constant, capacity, and $T_{c1}$. This suggests that there is an unexpected benefit to using LiCl as the Li source during the second heating.

$Li_{1+x}Mn_{2-x}O_4$ with lower surface area for a given value of x>0 can thus be prepared using the method of the invention and can be associated with improved battery performance. Additionally, the use of LiCl as a reactant salt can result in a $Li_{1+x}Mn_{2-x}O_4$ cathode material that exhibits unexpected improvements in fade rate.

As will be apparent to those skilled in the art in the light of the foregoing disclosure, many alterations and modifications are possible in the practice of this invention without departing from the spirit or scope thereof. For example, the insertion compound intermediate might have somewhat varied Li and/or Mn content rather than exactly the stoichiometry $Li_1Mn_{2-y}M_yO_4$. Additionally, it is possible to purchase the insertion compound intermediate commercially. Thus, some of the preparation steps might be easily separated if desired. Also, two heating stages can be avoided if the insertion compound intermediate is first prepared at the intermediate reaction temperature, cooled to the final reaction temperature, and then mixed with the final reactant lithium salt while still hot. Accordingly, the scope of the invention is to be construed in accordance with the substance defined by the following claims.

What is claimed is:

1. A method for making an insertion compound having the formula $Li_{1+x}Mn_{2-x-y}M_yO_4$ wherein M is a transition metal, x is a number greater than zero and less than 0.33, y is a number greater than or equal to zero and less than about 1, the insertion compound having a spinel-phase crystal structure, and a maximum critical temperature for phase stability $T_c$; said method comprising selecting a process from the group consisting of:

(a) (1) heating a stoichiometric mixture of a first lithium salt and a first manganese compound at a temperature in the range from greater than $T_c$ but less than about 900° C. so that an intermediate compound and having the approximate formula $Li_1Mn_{2-y}M_yO_4$ and a spinel-phase crystal structure is obtained;

(2) mixing a stoichiometric amount of the intermediate compound and a second lithium salt selected to obtain said insertion compound at a temperature less than $T_c$; and (3) heating the stoichiometric amount of said intermediate compound and said second lithium salt at a temperature in the range from greater than 400° C. to less than about $T_c$ so that said insertion compound having the formula $Li_{1+x}Mn_{2-x-y}M_yO_4$ is obtained; and (b) heating a stoichiometric mixture of LiCl and a second manganese compound at a reaction temperature in the range from greater than about 400° C. to less than about $T_c$, so that said insertion compound having the formula $Li_{1+x}Mn_{2-x-y}M_yO_4$ is obtained.

2. A method for making an insertion compound having the formula $Li_{1+x}Mn_{2-x-y}M_yO_4$ wherein M is a transition metal, x is a number greater than zero and less than 0.33, y is a number greater than or equal to zero and less than about 1, the insertion compound having a spinel-phase crystal structure and a maximum critical temperature for phase stability $T_c$, comprising:

(a) heating a stoichiometric mixture of a first lithium salt and a first manganese compound at a temperature in the range greater than $T_c$ but less than about 900° C. so that an intermediate compound having the approximate formula $Li_1Mn_{2-y}M_yO_4$ and a spinel-phase crystal structure is obtained;

(b) mixing a stoichiometric amount of the intermediate compound and a second lithium salt selected to obtain said insertion compound at a temperature less than $T_c$; and (c) heating the stoichiometric amount of said intermediate compound and said second lithium salt at a temperature in the range from greater than about 400° C. to less than about $T_c$, so that said insertion compound having the formula $Li_{1+x}Mn_{2-x-y}M_yO_4$ is obtained.

3. A method for making an insertion compound as claimed in claim 2 wherein y is greater than zero and M is Ni.

4. A method for making an insertion compound as claimed in claim 2 wherein y is zero.

5. A method for making an insertion compound as claimed in claim 4 wherein $T_c$ is approximately given by the equation: $T_c=(850-1250*x)°$ C.

6. A method for making an insertion compound as claimed in claim 4 wherein x is greater than about 0.05 and less than about 0.2.

7. A method for making an insertion compound as claimed in claim 6 wherein the final reaction temperature is in the range from greater than about 400° C. to less than about 790° C.

8. A method for making an insertion compound as claimed in claim 2 wherein the intermediate reaction temperature is about 900° C.

9. A method for making an insertion compound as claimed in claim 2 wherein the mixing temperature is ambient temperature.

10. A method for making an insertion compound as claimed in claim 2 wherein the intermediate reactant manganese compound is electrolytic manganese dioxide.

11. A method for making an insertion compound as claimed in claim 2 wherein the intermediate reactant lithium salt is $Li_2CO_3$.

12. A method for making an insertion compound as claimed in claim 2 wherein the final reactant lithium salt is selected from the group consisting of LiCl, LiF, and $Li_2CO_3$.

13. A method for making an insertion compound $Li_{1+x}Mn_{2-x-y}M_yO_4$ wherein M is a transition metal, x is a number greater than zero and less than 0.33, y is a number greater than or equal to zero and less than about 1, the insertion compound having a spinel-phase crystal structure and a maximum critical temperature for phase stability $T_c$, comprising heating a stoichiometric mixture of LiCl and a first manganese compound at a reaction temperature in the range from greater than about 400° C. to less than about $T_c$, so that the insertion compound having the formula $Li_{1+x}Mn_{2-x-y}M_yO_4$ is obtained.

14. A method for making an insertion compound as claimed in claim 13 wherein y is zero.

15. A method for making an insertion compound as claimed in claim 14 wherein $T_c$ is approximately given by the equation: $T_c=(850-1250*x)°$ C.

16. A method for making an insertion compound as claimed in claim 14 wherein x is greater than about 0.1 and less than about 0.2.

17. A method for making an insertion compound as claimed in claim 16 wherein the lattice parameter of the insertion compound is in the range from greater than about 8.18 Å to less than about 8.22 Å.

18. A method for making an insertion compound as claimed in claim 16 wherein the final reaction temperature is in the range from greater than about 400° C. to less than about 725° C.

19. A method for making an insertion compound as claimed in claim 18 wherein the final stoichiometric mixture is heated at the final reaction temperature for at least 18 hours.

20. A method for making an insertion compound as claimed in claim 13 wherein the manganese compound is an insertion compound intermediate having the approximate formula $Li_1Mn_{2-y}M_yO_4$ and a spinel-phase crystal structure wherein the insertion compound intermediate is prepared by heating a stoichiometric mixture of lithium salt and a second manganese compound at a temperature greater than $T_c$ but less than about 900° C.

21. A method for making an insertion compound as claimed in claim 20 wherein the intermediate stoichiometric mixture is heated at the intermediate reaction temperature for at least 18 hours.

22. A lithium battery comprising a lithium compound anode; an electrolyte comprising a solvent and a lithium electrolyte salt; and a cathode comprising an insertion compound prepared by the method as claimed in claims 1, 2, 5, 6, 13 or 20.

23. A lithium battery as claimed in claim 22 wherein the lithium compound anode is carbonaceous.

24. A lithium battery as claimed in claim 22 wherein the lithium electrolyte salt is selected from the group consisting of $LiBF_4$ and $LiPF_6$.

25. A lithium battery as claimed in claim 22 wherein the solvent comprises ethylene carbonate.

26. A lithium battery as claimed in claim 25 wherein the solvent additionally comprises a carbonate solvent selected from the group consisting of propylene carbonate, diethyl carbonate, and dimethyl carbonate.

* * * * *

UNITED STATES PATENT AND TRADEMARK OFFICE
CERTIFICATE OF CORRECTION

PATENT NO. : 5,700,597
DATED : December 23, 1997
INVENTOR(S) : Zhong et al.

It is certified that error appears in the above-identified patent and that said Letters Patent is hereby corrected as shown below:

Column 2, line 13, "(1994)" should read --(1995)--.

Column 5, line 64, "$Li_{1+x}Mn_{2-x}M_yO_4$" should read -- $Li_{1+x}Mn_{2-y}M_yO_4$ --.

Column 11, line 8, "$Li_{1+x}Mn_{2-x}O_4$" should read -- $Li_{1+x}\cdot Mn_{2-x}\cdot O_4$ --.

Column 11, line 46, "(FMC Corp." should read --(FMC Corp.)--.

Signed and Sealed this

Twenty-sixth Day of May, 1998

Attest:

BRUCE LEHMAN

Attesting Officer     Commissioner of Patents and Trademarks